Patented Mar. 6, 1951

2,544,103

UNITED STATES PATENT OFFICE 2,544,103

TETRANITRODIOLS AND METHOD OF PREPARING SAME

Herman Plaut, Los Angeles, Calif., assignor to Aerojet Engineering Corporation, Azusa, Calif., a corporation of Delaware No Drawing. Application January 22, 1949, Serial No. 72,259

8 Claims. (Cl. 260—635)

1

This invention relates to new compositions of matter and in particular to a new class of organic compounds.

The object of this invention is to provide an organic compound containing four nitro groups in the molecule and having at least two functional groups associated therewith; the particular functional groups in this series being the hydroxyl group.

A further object of this invention is the development of processes for synthesizing these compounds.

Heretofore many attempts have been made to produce compounds having a large number of nitro groups in conjunction with a plurality of functional groups in the same molecule but up to the present time compounds such as those described in the present application have been unknown.

According to my invention, I have succeeded in making compounds belonging to a series having the general formula

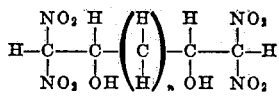

The value of $n$ on the outside of the parenthesis on the central

group may be zero or any whole number up to two, inclusive.

Compounds having this formula are extremely valuable as intermediates since they possess many functional groups which may be made to react in a number of ways thereby permitting the synthesis of many new and difficultly obtainable substances.

In general, these compounds are prepared by admixing any salt of dinitromethane with a dialdehyde having the general formula

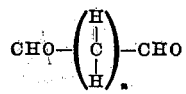

in which the value of $n$ may be zero or any whole number up to two, inclusive.

The dialdehyde most available is glyoxal and in cases where this substance is employed the value of $n$ in the general formula for the dialdehyde becomes zero.

The method by which this series of compounds, hereafter referred to as tetranitrodiols, is prepared, is set forth briefly in the following procedure, however, this invention is not limited to this procedure but will include any other steps and modifications which any one skilled in the art would recognize as equivalent to the same process.

A suspension of a salt of dinitromethane, preferably the dialkali, or dialkaline-earth metal salts, and the dialdehyde is made in such proportions as are required by the particular molecule selected. In most cases the ratio will be two molecular weights of the salt of dinitromethane to one molecular weight of the dialdehyde; although at times it may be desirable to introduce a slight excess of dialdehyde to insure complete reaction. The temperature of the mixture is then raised until all of the solids are dissolved and the solution is then cooled to below the temperature at which the salt of tetranitrodiol begins to separate out. The salt corresponds to the formula

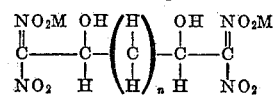

in which M represents one valence of any cation, used in forming the dinitromethane salt.

The free tetranitrodiol may be prepared by cautiously acidifying the salt at low temperature with a dilute solution of strong acid such as sulphuric acid, hydrochloric acid, etc. The tetranitrodiol is extracted from the solution with an appropriate solvent. The extracted material is dried and the solvent removed at reduced pressure. The tetranitrodiol remains as the residue. The free tetranitrodiol is acidic in nature and may be unstable, therefore, it should not be stored in this form. If storage is necessary, it is preferable to store as a salt.

The salt of the tetranitrodiol may be converted into a di-halogen derivative with the general formula

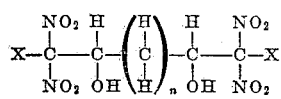

where $n$ may vary from zero on up and X may be chlorine, bromine, or iodine. These halogen derivatives are very useful in determining the character of the tetranitrodiol. The method in which these compounds are formed is briefly as follows:

A tetranitrodiol salt is suspended in an inert solvent such as water, alcohol, ether, etc., and the material is treated with the desired halogen. If water is used as a solvent the halogen tetranitrodiol separates from the water as a white, water insoluble material. When other solvents are substituted for water, appropriate steps must be taken to isolate the halogen derivatives. The steps are well-known to those skilled in the art. It will be recognized that these procedures are particularly valuable for the isolation of the pure product. The following example shows the manner in which specific tetranitrodiols are prepared:

EXAMPLE I

*Formation of 1,1,4,4-tetranitro-2,3-butanediol*

$$\begin{array}{c} NO_2\ H\ \ \ H\ \ NO_2 \\ |\ \ \ |\ \ \ \ \ |\ \ \ \ | \\ H-C-C-C-C-H \\ |\ \ \ \ |\ \ \ \ |\ \ \ \ | \\ NO_2\ OH\ OH\ NO_2 \end{array}$$

For convenience the formation of this substance has been divided into two steps:

A. FORMATION OF DIPOTASSIUM SALT

One mole of the dipotassium salt of dinitromethane (182 gms.) is suspended in water at 30° C. One-half-mole of 30% glyoxal solution (100 gms. containing ½ mole of glyoxal+5% excess) is added to the salt and the temperature is slowly raised to between 35–40° C. Stirring of the mixture is continued for ten minutes at which time all of the salt will have dissolved and reaction is substantially completed. The solution is then cooled to 0° C. and the dipotassium salt of 1,1,4,4-tetranitro-2,3-butanediol is filtered off.

B. FORMATION OF THE FREE TETRANITRODIOL

The reaction product with the suspended salt is agitated and the temperature of the mixture is lowered to between 0–5° C.

A 5–10% of a solution of sulphuric acid containing one mole of acid in water is then added slowly to the aqueous salt suspension, the resulting clear solution is extracted with four 250 ml. portions of ether and the ether extracts are dried over anhydrous sodium sulphate. The remaining ether is removed at reduced pressure and the tetranitrodiol remains in the form of a brown liquid. The average yield from this procedure is 70–80%.

EXAMPLE II

*Formation of 1,1,6,6-tetranitro-2,5-hexanediol*

$$\begin{array}{c} NO_2\ H\ \ \ H\ H\ \ \ H\ \ NO_2 \\ |\ \ \ |\ \ \ |\ \ |\ \ |\ \ \ | \\ H-C-C-C-C-C-C-H \\ |\ \ \ \ |\ \ \ |\ \ |\ \ \ |\ \ \ \ | \\ NO_2\ OH\ H\ H\ OH\ NO_2 \end{array}$$

Again for convenience formation of this substance has been set forth in two stages.

A. FORMATION OF THE DIPOTASSIUM SALT

One mole of dipotassium salt of dinitromethane is suspended in water at 30° C. One-half mole of succinyl aldehyde is added to the salt and the temperature slowly raised between 35–40° C. Stirring of the mixture is continued for sufficient time to permit the salt to dissolve and the reaction is substantially completed. The solution is then cooled to 0° C. and the dipotassium salt of 1,1,6,6-tetranitro-2,5-hexane is filtered off.

B. FORMATION OF THE FREE TETRANITRODIOL

The reaction product with a suspended salt is agitated and the temperature of the mixture is lowered between 0–5° C. A 5–10% sulphuric solution, containing one mole of acid in water, is then added slowly to the aqueous solution. The resulting clear solution is extracted with four 250 ml. of ether and the ether extracts are dried over anhydrous sodium sulphate. The solvent ether is then removed at reduced pressure leaving the tetranitrohexanediol behind.

The reactions in this example are as follows:

$$CHO-(CH_2)_2-CHO + M_2C(NO_2)_2 \longrightarrow$$

$$\begin{array}{c} NO_2M\ H\ \ \ H\ H\ \ \ H\ \ NO_2M \\ \diagdown\ \ \ \ |\ \ \ |\ \ |\ \ |\ \ \ \ \diagup \\ C-C-C-C-C-C \\ \diagup\ \ \ \ |\ \ \ |\ \ |\ \ \ |\ \ \ \ \diagdown \\ NO_2\ OH\ H\ H\ OH\ NO_2 \end{array}$$

$$\begin{array}{c} NO_2M\ H\ \ \ H\ H\ \ \ H\ \ NO_2M \\ \diagdown\ \ \ \ |\ \ \ |\ \ |\ \ |\ \ \ \ \diagup \\ C-C-C-C-C-C \\ \diagup\ \ \ \ |\ \ \ |\ \ |\ \ \ |\ \ \ \ \diagdown \\ NO_2\ OH\ H\ H\ OH\ NO_2 \end{array} + H^+ \longrightarrow$$

$$\begin{array}{c} NO_2\ H\ \ \ H\ H\ \ \ H\ \ NO_2 \\ |\ \ \ |\ \ \ |\ \ |\ \ |\ \ \ | \\ H-C-C-C-C-C-C-H \\ |\ \ \ \ |\ \ \ |\ \ |\ \ \ |\ \ \ \ | \\ NO_2\ OH\ H\ H\ OH\ NO_2 \end{array}$$

An advantage of the type of compound listed above is that it may be employed to form new or difficultly obtainable substances.

It is apparent that the compounds of the series made available by my invention afford a convenient form of matter which possesses many functional groups and which may be easily substituted, permitting the formation of a large number of heretofore unknown compounds.

I claim:

1. A new composition of matter comprising a tetranitrodiol having a general formula $$\begin{array}{c} NO_2\ H\ \ \ /H\backslash\ \ \ H\ \ NO_2 \\ |\ \ \ |\ \ \ (\ |\ )\ \ \ |\ \ \ | \\ H-C-C-(\ C\ )-C-C-H \\ |\ \ \ \ |\ \ \ (\ |\ )_n\ \ |\ \ \ \ | \\ NO_2\ OH\ \backslash H/\ \ OH\ NO_2 \end{array}$$

in which $n$ may be a whole number from zero to 2, inclusive.

2. A new composition of matter comprising 1,1,4,4-tetranitro-2,3-butanediol $$\begin{array}{c} NO_2\ H\ \ \ H\ \ NO_2 \\ |\ \ \ |\ \ \ \ \ |\ \ \ \ | \\ H-C-C-C-C-H \\ |\ \ \ \ |\ \ \ \ |\ \ \ \ | \\ NO_2\ OH\ OH\ NO_2 \end{array}$$

3. A new composition of matter comprising 1,1,6,6-tetranitro-2,5-hexanediol $$\begin{array}{c} NO_2\ H\ \ \ H\ H\ \ \ H\ \ NO_2 \\ |\ \ \ |\ \ \ |\ \ |\ \ |\ \ \ | \\ H-C-C-C-C-C-C-H \\ |\ \ \ \ |\ \ \ |\ \ |\ \ \ |\ \ \ \ | \\ NO_2\ OH\ H\ H\ OH\ NO_2 \end{array}$$

4. A new composition of matter comprising the halogen derivatives of the tetranitrodiols corresponding to the general formula $$\begin{array}{c} NO_2\ H\ \ \ /H\backslash\ \ \ H\ \ NO_2 \\ |\ \ \ |\ \ \ (\ |\ )\ \ \ |\ \ \ | \\ X-C-C-(\ C\ )-C-C-X \\ |\ \ \ \ |\ \ \ (\ |\ )_n\ \ |\ \ \ \ | \\ NO_2\ OH\ \backslash H/\ \ OH\ NO_2 \end{array}$$

in which $n$ may be zero or any whole number up to 2, inclusive, and X may be an element selected from the group consisting of chlorine, bromine and iodine.

5. A new composition of matter comprising a salt of tetranitrodiol corresponding to the general formula $$\begin{array}{c} NO_2M\ H\ \ \ /H\backslash\ \ \ H\ \ NO_2M \\ \|\ \ \ |\ \ \ (\ |\ )\ \ \ |\ \ \ \| \\ C-C-(\ C\ )-C-C \\ |\ \ \ \ |\ \ \ (\ |\ )_n\ \ |\ \ \ \ | \\ NO_2\ OH\ \backslash H/\ \ OH\ NO_2 \end{array}$$

where M represents one valence of any cation and $n$ may be a whole number from zero to 2, inclusive.

6. A process for synthesizing tetranitrodiol which comprises reacting a salt of dinitromethane with a dialdehyde having the general formula $$\begin{array}{c} O\ \ \ /H\backslash\ \ \ O \\ \|\ \ \ (\ |\ )\ \ \ \| \\ C-(\ C\ )-C \\ |\ \ \ (\ |\ )_n\ \ \ | \\ H\ \ \backslash H/\ \ \ H \end{array}$$

in which the value of $n$ may be a whole number from zero to 2, inclusive, acidifying the mixture of the dialdehyde and dinitromethane salt with a strong acid selected from the group consisting of sulphuric acid and hydrochloric acid, extracting the tetranitrodiol with a solvent, removing the solvent and collecting the tetranitrodiol as a residue.

7. A process for synthesizing 1,1,4,4-tetranitro-2,3-butanediol which comprises reacting one mole of a salt of dinitromethane with one-half mole of glyoxal, acidifying the reaction product of dinitromethane and glyoxal with a strong acid selected from the group consisting of sulphuric acid and hydrochloric acid, extracting the tetranitrodiol with a solvent, removing the solvent and collecting the 1,1,4,4-tetranitro-2,3-butanediol as a residue.

8. The process for synthesizing 1,1,6,6-tetranitro-2,5-hexanediol which comprises reacting one mole of a salt of dinitromethane with a half-mole of succinyl aldehyde, acidifying the reaction product of the salt of dinitromethane and succinyl aldehyde with a strong acid selected from the group consisting of sulphuric and hydrochloric, extracting 1,1,6,6-tetranitro-2,5-hexanediol with a solvent and collecting the tetranitrodiol as a residue.

HERMAN PLAUT.

REFERENCES CITED

The following references are of record in the file of this patent:

UNITED STATES PATENTS

| Number | Name | Date |
| --- | --- | --- |
| 2,132,330 | Vanderbilt | Oct. 4, 1938 |
| 2,139,120 | Hass et al. | Dec. 6, 1938 |
| 2,387,019 | Hass et al. | Oct. 16, 1945 |
| 2,475,996 | Smith | July 12, 1949 |

OTHER REFERENCES

Journal of Industrial and Engineering Chemistry, Jan. 1940, pages 34-38 (Vanderbilt and Hass).

Certificate of Correction

Patent No. 2,544,103　　　　　　　　　　　　　　　　March 6, 1951

HERMAN PLAUT

It is hereby certified that error appears in the printed specification of the above numbered patent requiring correction as follows:

Column 4, lines 29 to 32, for that portion of the formula reading

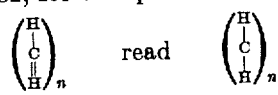

and that the said Letters Patent should be read as corrected above, so that the same may conform to the record of the case in the Patent Office.

Signed and sealed this 14th day of August, A. D. 1951.

[SEAL]

THOMAS F. MURPHY,
*Assistant Commissioner of Patents.*